Figure 1:
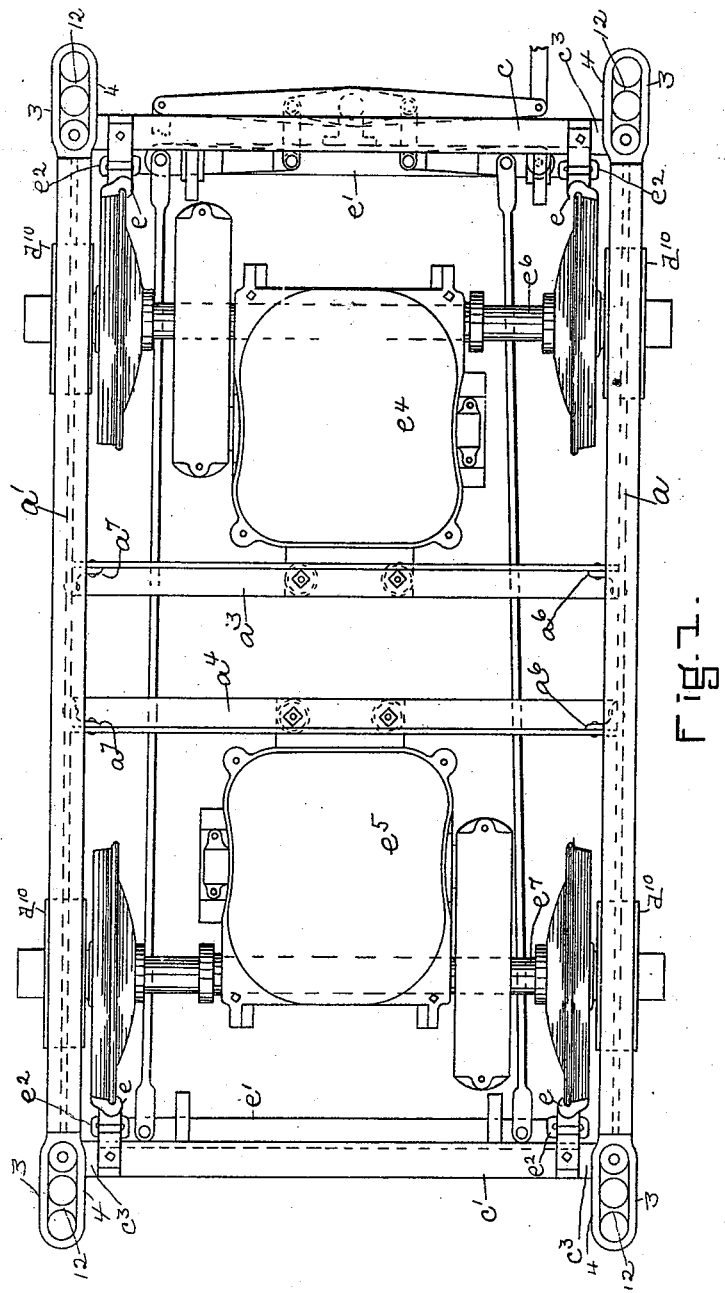

(No Model.)
2 Sheets—Sheet 1.

L. J. HIRT.
ELECTRIC CAR TRUCK.

No. 550,393. Patented Nov. 26, 1895.

WITNESSES.
Matthew M. Blunt
J. Murphy

INVENTOR.
Louis J. Hirt
By Jas. H. Churchill
Atty.

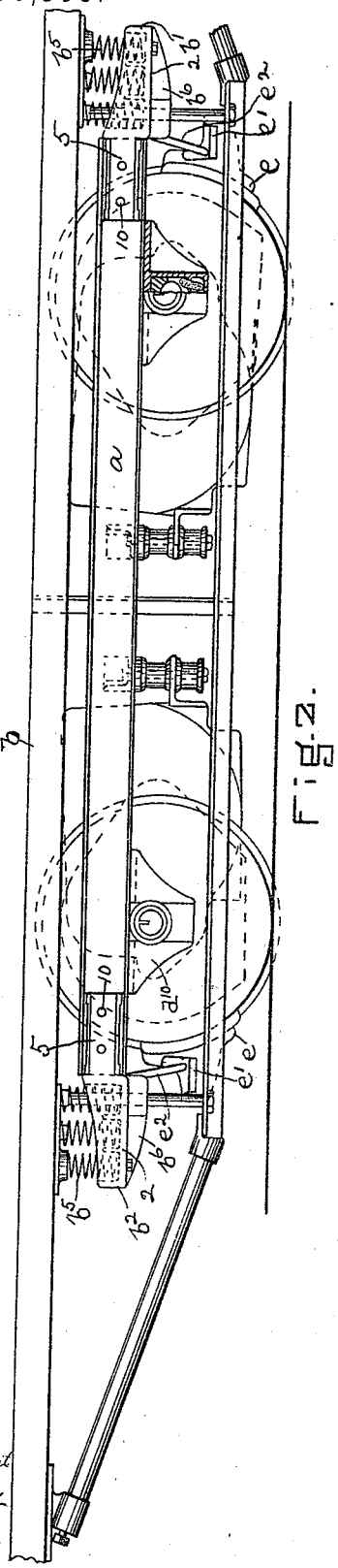

UNITED STATES PATENT OFFICE.

LOUIS J. HIRT, OF SOMERVILLE, MASSACHUSETTS.

ELECTRIC-CAR TRUCK.

SPECIFICATION forming part of Letters Patent No. 550,393, dated November 26, 1895.

Application filed March 5, 1894. Serial No. 502,308. (No model.)

*To all whom it may concern:*

Be it known that I, LOUIS J. HIRT, residing at Somerville, in the county of Middlesex and State of Massachusetts, have invented an Improvement in Electric-Car Trucks, of which the following description, in connection with the accompanying drawings, is a specification, like letters on the drawings representing like parts.

This invention relates to car-trucks of that class employed in electric street-railway systems, and has for its object to provide a strong, efficient, and inexpensive truck especially designed to support cars having a short body portion.

Electric street-railway cars having a substantially short body supported on a single four-wheel truck possess the disagreeable feature of teetering or longitudinal oscillation or rocking, and it is one of the objects of this invention to provide a four-wheel truck by which this objectionable feature may be avoided or at least reduced to a minimum, and I accomplish this result by providing a four-wheel truck of a construction, as will be described, by which the car-body is brought substantially close to the top of the truck-frame without sacrifice to the easy riding of the car.

In accordance with this invention the truck-frame is provided with straight or substantially straight sides, with which the bottom of the car-body lies substantially parallel when supported by the truck, and the said sides have secured to them pocketed spring supports or seats of such suitable construction that the surface upon which the springs rest shall lie below the top of the truck-frame a distance sufficient to permit of the desired or required length of springs to be used to support the car-body. The spring-support will be provided on its upper surface with a single long pocket or a plurality of smaller pockets for the reception of the lower part of spiral springs, and in order that the sides of the truck-frame may be of minimum length the said spring-supports at the ends of the truck have riveted, bolted, or otherwise firmly secured to them cross-bars forming the end bars of the truck-frame. The sides of the truck-frame are preferably made of a single I-beam, in order to obtain strength with a minimum amount of metal and thereby also obtain a reduction in the cost of the truck, and the said spring-supports are riveted or otherwise firmly secured to the side of the truck-frame, as will be described.

These and other features of this invention will be pointed out in the claims at the end of this specification.

Figure 1 is a top or plan view of a four-wheel electric truck embodying this invention; Fig. 2, a side elevation of the truck shown in Fig. 1 with a portion of the car-body broken off; and Fig. 3 a sectional detail through one of the axle-boxes, to be referred to.

The truck-frame herein shown is composed of two side I-beams $a\ a'$, joined together near the center of the truck by angle-bars $a^3\ a^4$, firmly secured to the I-beams $a\ a'$ by corner angle-pieces $a^6\ a^7$, as clearly shown in Fig. 1.

The sides $a\ a'$ of the truck-frame are made straight or substantially straight, so as to normally lie substantially parallel with the rails of the track, represented by the heavy black line, Fig. 2, and in order to bring the bottom $b$ of the car-body as close to the top of the sides $a\ a'$ of the truck as possible, to thereby lower the center of gravity of the car and give it increased stability without sacrifice to its easy riding, the sides $a\ a'$ have secured to them at their opposite ends pocketed spring supports or seats $b'\ b^2$, which are constructed and secured to the said sides of the truck-frame, so as to obtain the desired or required distance between them and the under side of the car-body $b$ to permit of the use of a substantially long or correct length or height of spring to obtain the desired or required spring action for the car.

Each pocketed spring seat or support $b\ b'$ may be made as herein shown, it consisting of a bottom plate 2, located below the top of the sides of the truck-frame, and upright walls 3 4, herein shown as rounded at their ends, and one or more rearwardly-extended arms 5 of substantially the height of the web 6 of the I-beam, so as to fit between the top 7 and bottom 8 of the same, and to which web the said arm is firmly secured, as by rivets 10.

The side walls 3 4 of the spring-support are preferably curved downwardly from the arm 5 toward the front of the said support, (see Fig. 2,) and the bottom plate 2 has erected from it suitable partition-walls 12 to subdivide the main pocket formed by the side walls 3 4 into supplementary pockets, into which latter are placed the coiled spring $b^5$, which, by reason of their lower seat being located below the top of the sides $a\ a'$ of the truck-frame, may be made of the desired size, length, and strength to support the car-body and its load, yet obtain the desired or required easy riding of the said car. The side walls 3 4 extend upward from the bottom plate 2 a sufficient distance to form a substantially deep pocket, in which the lower part of the springs $b^5$ are located and confined by the walls 3 4, which avoids the necessity of retaining-bolts extended down through the said springs, as in car-trucks of this class employing a non-pocketed spring-seat.

Each spring-support may be strengthened by a web or rib $b^6$ on its under side, and in order that the sides $a\ a'$ of the truck may be of minimum length to permit a truck having straight sides to be used with a substantially short car-body—such, for instance, as a car-body sixteen feet in length, which is the desired length for this style of cars—the spring supports $b\ b'$ having secured to them the angle-bars $c\ c'$, constituting the end bars of the truck. In the present instance each spring-seat $b\ b'$ is provided with a lug or projecting piece $c^3$, to which the end bars $c\ c'$ are riveted or otherwise firmly secured.

The sides $a\ a'$ of the truck have riveted or otherwise firmly secured to their under sides housings $d^{10}$ for the boxes $d^{12}$ of the car-axles $e^6\ e^7$, the said boxes being preferably made with a rounded upper portion, as at $d^{15}$, Fig. 3, to permit of a free movement of the truck-frame on the axle.

The truck is provided with the usual brake mechanism, consisting, essentially, of the brake-shoes $e$, brake-beams $e'$, and hangers $e^2$, which latter are secured to and supported by the lugs or projecting pieces $c^3$ of the spring-supports, and in the present instance the truck-frame carries two electric motors $e^4\ e^5$, suspended from the car-axles $e^6\ e^7$ and from the cross-bars $a^3\ a^4$.

By reference to Fig. 2 it will be seen that the car-body $b$ is brought substantially close to the top of the car-truck, so that it is separated from the top of the sides $a\ a'$ but a substantially small distance, and yet by means of the spring-supports fastened to the ends of the sides $a\ a'$ and having their supporting-surface located below the top of the truck-frame the springs $b^5$ may be made of sufficient height or length to obtain the desired or required amount of spring action to obtain an easy-riding car without the usual disagreeable feature of rocking or teetering due to the car-body being supported above the car-truck by substantially long springs resting upon the top of the truck-frame. In the present instance it will be seen that the car-body is not permitted to have an excessive oscillation or teetering motion, as the center of gravity of the said car-body is materially lowered and a stop afforded for the downward movement of the ends of the car-body by the truck-frame.

I claim—

1. In a four-wheel electric car truck, a truck frame comprising straight side bars extended beyond the car axles of the truck, and independent pocketed spring supports extended in line with and beyond the ends of the said side bars and detachably secured thereto, the said spring supports comprising a bottom plate 2, the upright walls 3—4 forming the spring pocket, and a rearwardly extended arm 5 fastened to the said side bars, the bottom plate 2 being below the upper surface of the said side bars, substantially as described.

2. In a four wheel electric car truck, a truck frame comprising straight sides composed of I-beams each comprising a web 6, top 7, and bottom 8, independent pocketed spring supports consisting of the pocketed spring surface 2, the upright walls 3—4, and the upwardly extended and rearwardly projecting arm 5 fitted between the top 7 and bottom 8 of the I-beam and firmly secured to the web 6, substantially as described.

3. In a four wheel electric car truck, a truck frame comprising straight side bars extended beyond the car axles, in the same horizontal plane, housings for the car axles secured to the said sides between the ends of the same, and independent spring seats consisting of a pocketed spring supporting surface comprising the bottom plate 2, the upright walls 3—4 and an upwardly projecting and rearwardly extended arm 5, integral with the walls 3—4, and plate 2, and means to secure the arm 5 to the side bar of the truck, substantially as described.

In testimony whereof I have signed my name to this specification in the presence of two subscribing witnesses.

LOUIS J. HIRT.

Witnesses:
JAS. H. CHURCHILL,
J. MURPHY.